(12) United States Patent
Griggs et al.

(10) Patent No.: US 8,458,169 B2
(45) Date of Patent: Jun. 4, 2013

(54) MINI-FORM VIEW FOR DATA RECORDS

(75) Inventors: Ryan Griggs, San Jose, CA (US); Peter Nelson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 660 days.

(21) Appl. No.: 12/567,722

(22) Filed: Sep. 25, 2009

(65) Prior Publication Data

US 2011/0078109 A1    Mar. 31, 2011

(51) Int. Cl.
*G06F 7/00* (2006.01)
*G06F 17/30* (2006.01)

(52) U.S. Cl.
USPC .......................................................... 707/722

(58) Field of Classification Search
USPC .......................................................... 707/722
See application file for complete search history.

(56) References Cited

U.S. PATENT DOCUMENTS

| | | |
|---|---|---|
| 2005/0243381 A1 | 11/2005 | Hill et al. |
| 2006/0080292 A1* | 4/2006 | Alanzi ............................... 707/3 |
| 2006/0150215 A1* | 7/2006 | Wroblewski .................... 725/47 |
| 2006/0242238 A1 | 10/2006 | Issa |
| 2007/0083468 A1 | 4/2007 | Wetherell |
| 2008/0034381 A1* | 2/2008 | Jalon et al. .................... 719/329 |
| 2008/0249891 A1 | 10/2008 | Gura |
| 2009/0100068 A1 | 4/2009 | Gauba et al. |
| 2009/0150792 A1* | 6/2009 | Laakso et al. .................. 715/738 |
| 2009/0292681 A1* | 11/2009 | Wood et al. ........................ 707/3 |

FOREIGN PATENT DOCUMENTS

WO    WO2007035637    3/2007

OTHER PUBLICATIONS

"Thumbnails," From XBMC; [Online] Retrieved from the Internet on Sep. 25, 2009 from URL: http://www.xbmc.org./wiki/index.php?title=Thumbnails, 9 pages.
"Gallery2 Features," [Online] Retrieved from the Internet on Sep. 25, 2009 from URL: http://gallery.menalto.com/features, 6 pages.
"Fluxiom Digital Assets Manager," Solution Watch, [Online] Retrieved from the Internet on Sep. 25, 2009 from URL: http://www.solutionwatch.com/373/fluxiom-digital-assets-manager/, 5 pages.
"Dig deeper," fluxiom blog, [Online] Retrieved from the Internet on Sep. 25, 2009 from URL: http://blog.fluxiom.com/2006/4/14/dig-deeper, 3 pages.
"Getting Started: Advanced Image Search operators and filters," [Online] Retrieved from the Internet on Sep. 25, 2009 from URL: http://www.google.com/support/websearch/bin/answer.py?hl=en&answer=142515, 1 page.

\* cited by examiner

*Primary Examiner* — Fred I Ehichioya
*Assistant Examiner* — Kris Mackes
(74) *Attorney, Agent, or Firm* — Fish & Richardson P.C.

(57) ABSTRACT

Methods, program products, and systems for mini-form view of data records are described. Each data records can be formatted according to a layout. The layout can define an arrangement of various data fields for display. To display multiple data records, an image can be created for each formatted data record. Each image can be a snapshot of the formatted data record. The image can have a size that is smaller than the size of the layout. The arrangement of the data fields can be preserved in the image. Multiple images of formatted data records can be displayed in a single window. By displaying formatted data records in images, the "look and feel" in the layout of each data record can be preserved, even when multiple records are displayed. The mini-form view can display data records from multiple shared databases.

24 Claims, 13 Drawing Sheets

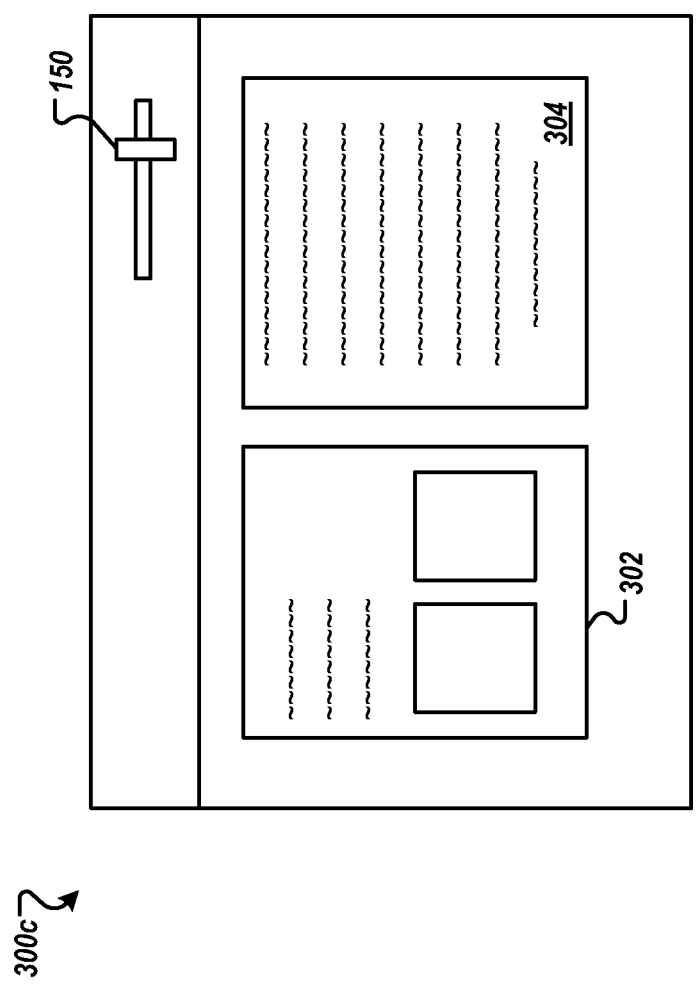

MINI-FORM VIEW FOR DATA RECORDS

TECHNICAL FIELD

This disclosure relates generally to formatting data.

BACKGROUND

A modern database application program can provide graphical user interfaces for visually displaying and editing data stored in a database. The data can be retrieved from the database as result sets (sometimes referred to as found sets) using one or more database queries (sometimes referred to as find requests). A result set can include a collection of data records. The data records in the result set can be formatted for display. For example, in a database program for auctions, a user can query for a particular item or category of items being auctioned (e.g., "computers"). In response, the database program can return a result set containing data records on matching items. Each data record can correspond to a particular item. The data record can correspond to formatting information that specifies how the various data fields concerning the item (e.g., name, price, description, and picture of the item) can be displayed on screen.

The user can view each item individually, or view multiple items in a list. When the user views an individual item, the display can be formatted using the corresponding formatting information. For example, the name, price, and description of a computer each can have a specific font, display size, and color. The picture can be displayed at a particular positioned on screen. In contrast, when the user views multiple items on a display screen, the records can be arranged as a table or a list. Displaying the items in a table or a list can hide the corresponding formatting information for the item. Therefore, viewing the table or list of auction items, the user may not see how each auction item will be presented when displayed individually.

SUMMARY

Methods, program products, and systems for mini-form view of data records are described. Each of the data records can be formatted for display according to a layout. The layout can define an arrangement of various data fields (including images) for display. To display multiple data records, an image (e.g., a mini-sized form, or mini-form) can be created for each formatted data record. Each image can be a snapshot of the formatted data record. The image can have a size that is smaller than the size specified in the layout. However, the arrangement of the data fields in the layout can be preserved in the image. The arrangement can be scaled according to the size of the image, which can be adjustable. Multiple images of formatted data records can be displayed in a single window. By displaying formatted data records in images, the "look and feel" in the layout of each data record can preserved, even when multiple records are displayed. The multiple images can be displayed in a display pattern (e.g., a grid). The mini-form view can display data records from multiple shared databases.

In some implementations, various display items, including images of formatted data records, can be put in a library. The display items in the library can be organized into a hierarchical structure (e.g., a folder and sub-folder structure) having various levels. A user can browse the display items by navigating a source list, which can visualize the hierarchical structure. When the user selects a level, the display items at that level can be displayed. If one of the items being displayed (e.g., a folder) contains other display items of a lower level (e.g., mini-forms in the folder), the lower-level display items can be displayed in animation. Upon a user selection of the item (e.g., selecting the folder), the display can be animated to cycle through each of the items contained in the folder. The animation can occur in the display area occupied by the selected item. The user selection can include, for example, a movement of a pointer across the displayed folder. The user can view details of a particular display item by making a second selection to select that display item (e.g., by clicking on the display item when the item is being displayed according to the cycle).

Techniques for presenting mini-form view for data records can be implemented to achieve the following exemplary advantages. A database application user can view results in grid mode, as well as other modes. In grid mode, multiple database query results can be displayed on a single page as mini-forms, while the formatting of each result is preserved. The user can view a mini-form of a formatted query result in arbitrary size. Changes in a data record in one mini-form can be reflected in all the mini-forms. The user can browse database query results side by side with other content (e.g., images, video clips, or documents). The user can view multiple levels of display content in one or more animations on one display device. Each animation can be independent of another animation. As such, multiple levels of content can be displayed in single display window. The user can manipulate display items in arbitrary numbers of levels.

The details of one or more implementations of mini-form view for data records are set forth in the accompanying drawings and the description below. Other features, aspects, and advantages of mini-form view for data records will become apparent from the description, the drawings, and the claims.

BRIEF DESCRIPTION OF THE DRAWINGS

FIGS. 3A-3C illustrate exemplary user interfaces for configuring a mini-form view display of images data records.

Like reference symbols in the various drawings indicate like elements.

DETAILED DESCRIPTION

Mini-Form View for Data Records Overview

Figure 1A:
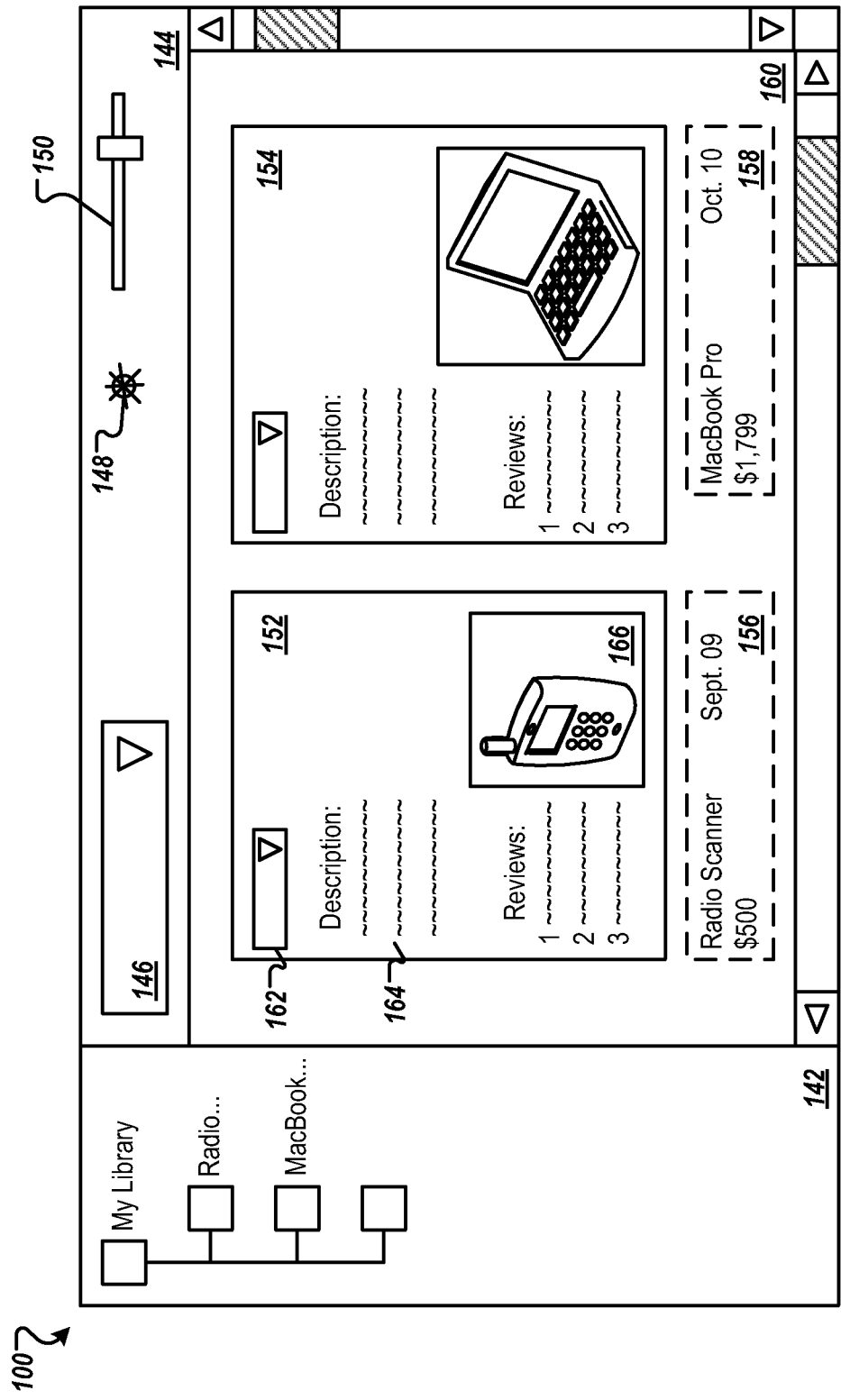
FIG. 1A illustrates an exemplary mini-form view of images of formatted data records.

FIG. 1A illustrates an exemplary mini-form view 100 of images of formatted data records. For convenience, user interface 100 will be described with reference to an application program that implements user interface 100.

Mini-form view 100 can be a visual display area that displays various display items. The visual display area can occupy an entire screen of a display device, a section of the display device (e.g., a window), or a section of a window (e.g., a pane).

Mini-form view 100 can include various sections. For example, section 160 can be a main section of mini-form view 100. One or more images 152 and 154 of various database forms can be displayed in an evenly spaced pattern (e.g., grid, table, list, etc.) in main section 160. In this specification, the term "database form" can be used to refer to a visual user interface for displaying one or more data records. A database form can include at least two conceptual components: data and layout. The data of the database form can be data retrieved from a database using one or more queries. The data can include one or more data fields. For example, in an online auction database, the data fields can include "name," "price," "description," etc. The layout of the database form can specify an arrangement on how the data are displayed. The layout can specify one or more data components, each data component corresponding to a data field in the data record. A database application developer can visually arrange the data components in the layout such that various types of data can be displayed at various positions. For example, data having an enumeration (enum) type can be displayed using a list. The "name" of an item being auctioned can be displayed in bold type; the "price" of the item can be displayed below the name; images can be displayed on fixed or variable image areas, etc.

Sometimes it is desirable to display multiple database forms in one single window or pane. However, depending on the number and complexity of the data components, a database form can occupy a large area of a display device. For example, image 152 can represent a database form containing numerous drop-down list, text, and graphics fields that, when displayed in the size specified in the layout, can occupy an entire screen. When the display device is a screen on a mobile device, even an entire screen may be insufficient for displaying the database form. A conventional database application program may attempt to solve the problem by presenting a digest of the form. In a digest, parts of the data record (e.g., a snippet of text, etc.), rather than all the text, are displayed. Furthermore, the digest can be displayed in a list or table. Thus, the digest may not reflect the arrangement defined in the layout of the form.

In main section 160, images 152 and 154 of database forms are displayed. Images 152 and 154 can be referred to as "mini-forms" to emphasis that conceptually, images 152 and 154 can be database forms having a small (e.g., thumbnail) size. For example, the mini-forms can be snapshot images of underlying database forms. Each of images 152 and 154 can have a different (e.g., reduced) size, compared to the original database forms they represent. For example, stripe 162 can represent a drop-down list; wavy lines 164 can represent text; image 166 can be a thumbnail of an original image, etc. Large-sized text (e.g., titles "Description" and "Reviews") can be shown in reduced size. Therefore, multiple images 152 and 154 of database forms can be displayed in a single window or pane having limited display "real estate" (e.g., area for display). Furthermore, the size of each image can be adjustable. Images 152 and 154 can be generated from the database forms automatically at various times (e.g., at time the application program is launched, at time the database is queried or updated, or at time that a user navigates to a group of database items).

Images 152 and 154 can, but is not required to, be digital pictures generated from the underlying database forms. In some implementations, images 152 and 154 can be rendered by a graphic engine in a manner similar to rendering a regular form. For example, images 152 and 154 can be generated based on a layout with reduced, but proportional dimensions. In some implementations, images 152 and 154 can contain simplified content. For example, lines of text segments in the database forms can be represented as wavy lines in images 152 and 154. Thickness of the lines can correspond to a font size; color of the lines can correspond to a font color; dashed lines can indicate italic or underline font, and so on.

Images 152 and 154 each can be displayed in association with property labels 156 and 158, respectively. Property labels 156 and 158 can each correspond to one or more parameters of the mini-forms. The content of property labels 156 and 158 can be configurable. Further details on configuring property labels 156 and 158 will be described below in reference to FIG. 3B.

Mini-form view 100 can include folder section 142. Folder section 142 can include various folders, e.g., icons, labels, or other user interfaces that can specify various display items that are displayed on main section 160. Each box in folder section 142 of FIG. 1A represents a folder or icon. By way of illustration, a folder labeled "My Library" can contain items (e.g., icons) labeled "Radio . . . " and "MacBook . . . " that correspond to images 152 and 154, respectively. Selecting the folder labeled "My Library" can cause images 152 and 154 to be displayed in main section 160. If a user selects another folder, other images corresponding to the other folder will be displayed. Further details on folder management will be described below in reference to FIGS. 2A-2C.

Mini-form view 100 can include control section 144 for allowing users to manipulate content in main section 160. Control section 144 can include a filter selection interface 146 for filtering the content, configuration interface 148 that allows a user to configure various properties of the images 152 and 154, and image size control interface 150 for control the sizes of the images. More details of the interfaces 146, 148, and 150 will be discussed below in various sections of this specification.

Figure 1B:
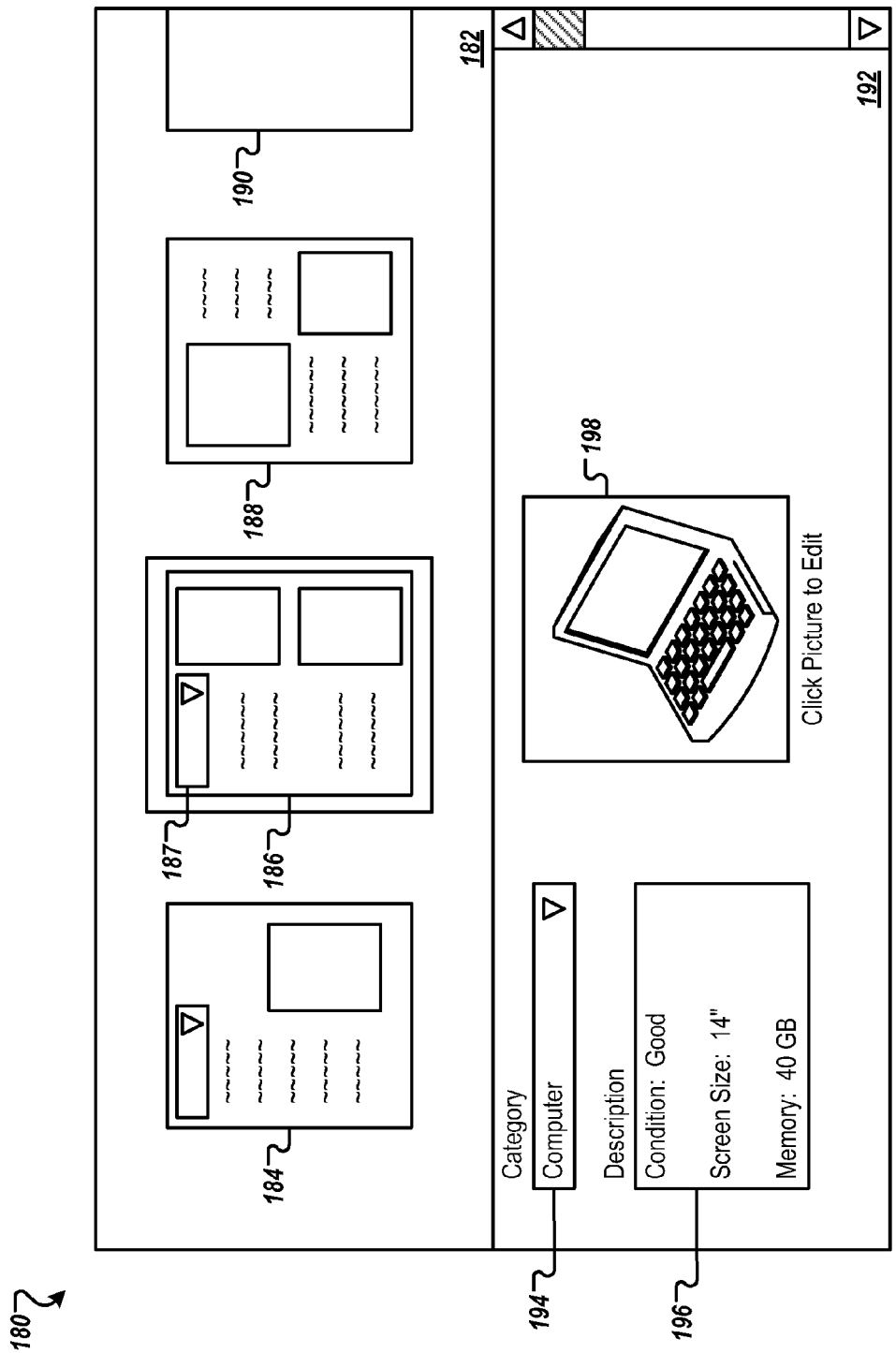
FIG. 1B illustrates an exemplary mini-form view of images of formatted data records where one data record is selected for editing.

FIG. 1B illustrates an exemplary mini-form view 180 of images of formatted data records where one data record is selected for editing. For convenience, folder section (e.g., folder section 142) or control section (e.g., control section 144) are omitted from mini-form view 180.

Mini-form view 180 can be divided into two sections, browse section 182 and detail section 192. Various images (e.g., mini-forms) 184, 186, 188, and 190 are displayed in browse section 182. Images 184, 186, 188, and 190 can be arranged in various ways in browse section 182. The arrangement can be determined by the size of each image and the size of browse section 182. Content of images 184, 186, 188, and 190 can include text (shown as wavy lines) and pictures (shown in rectangles in each of the images).

A user can select one of the images 184, 186, 188, or 190. The system can indicate in various ways that a particular image (e.g., image 186) is selected. For example, a highlighted frame can be displayed around selected image 186. In some implementations, the system can force an item (e.g., an item at the top-left position of a grid) to be selected by default, if the user does not make an explicit selection.

Once an image is selected, the database form corresponding to the image can be displayed in detail section 192 of the screen. The form can be displayed in full-size (e.g., the original size as specified in the layout). Furthermore, in some implementations, the form size can be adjustable. Therefore, a user can make a form as large or small as the user wishes.

By way of illustration, a user selects image 186. The database form underlying image 186 (e.g., the form based on which image 186 is created) can be displayed in detail section 192. Dropdown control 194, shown as stripe 187 in image 186, can be displayed in full size. Description text 196, shown as lines under stripe 197 in image 186, can be displayed in font, color, and size as specified by the layout. Picture 198, shown as a thumbnail in image 186, can be displayed based the specific formatting information according to the layout.

Detail section 192 is shown in the same mini-form view 180 as browse section 182, producing the visual effect of splitting mini-form view 180 (a window or a pane) into two portions. In this specification, each portion can be referred to as a viewport. Multiple viewports are not the only way to display a browse section and a detail section. In some implementations, the detail section can be displayed in a separate window, based on configuration or user preference.

In various implementations, images of database forms displayed in browse section 182 can share a same layout, or each use a distinct layout. In the example shown, each of images 184, 186, 188, and 190 has a distinct look (e.g., in terms of what data fields are displayed and how the data components are arranged). Each of images 184, 186, 188, and 190 can be generated using data from distinct queries, and formatted based on a distinct layout. By way of illustration, image 186 can correspond to a "for auction" item in the database, formatted using a layout specifically designed for "for auction" items (as opposed to, e.g., a layout for employee records).

Organizing Mini-Forms in Folders

Figure 2A:
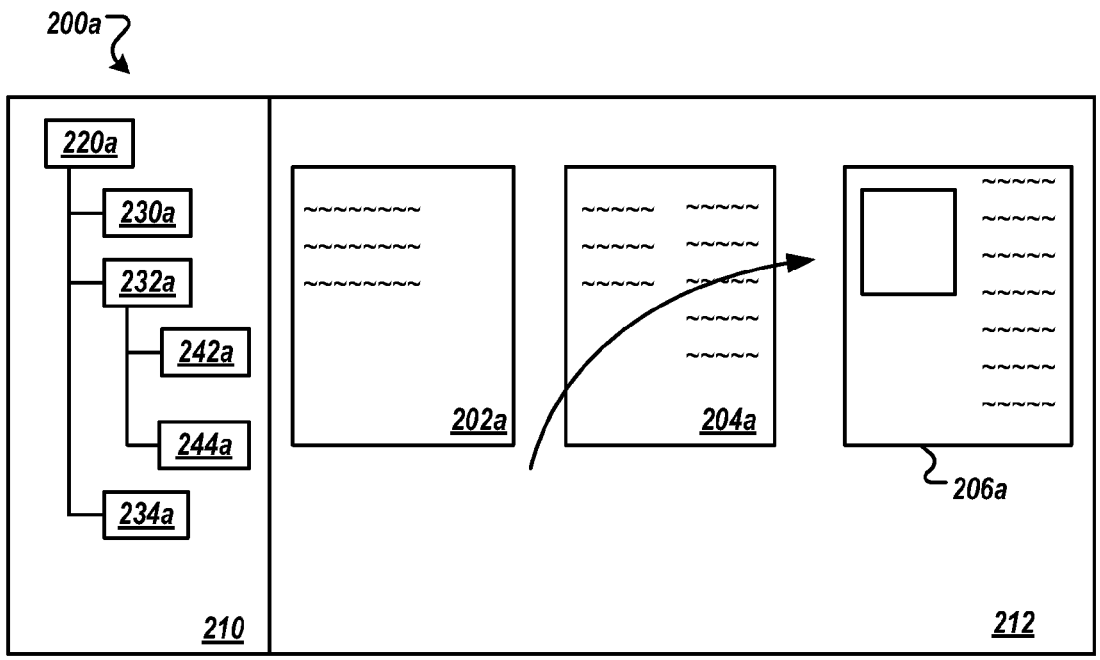
FIGS. 2A-2C illustrate exemplary mini-form views of images of formatted data records that are organized in a hierarchical structure.
Figure 2B:
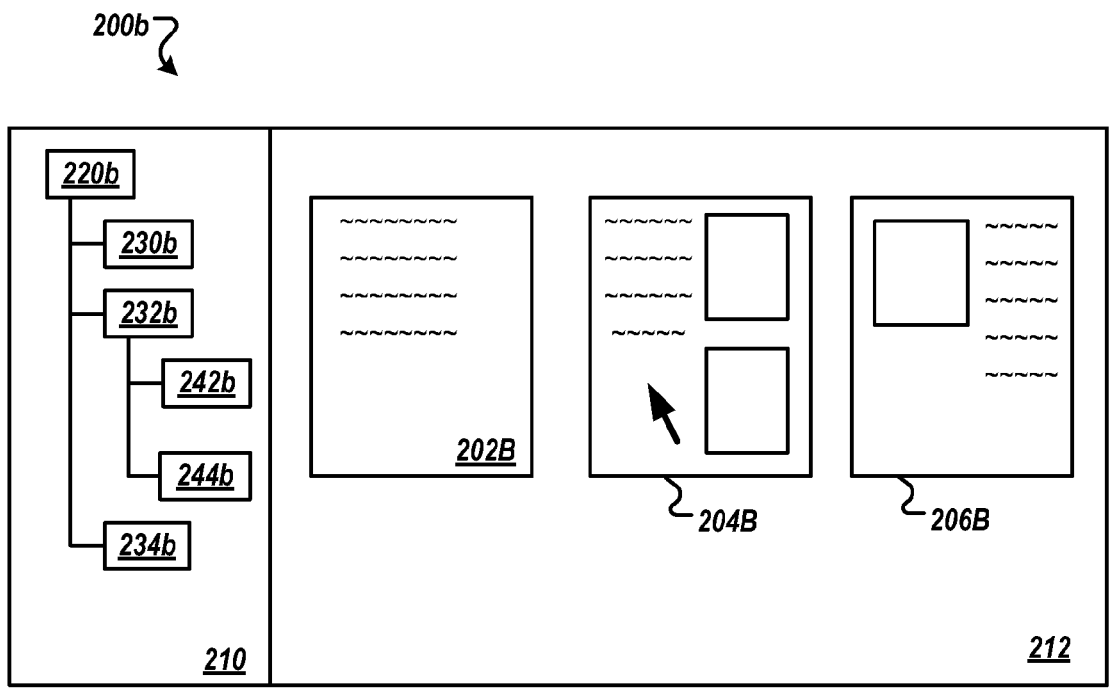
Figure 2C:
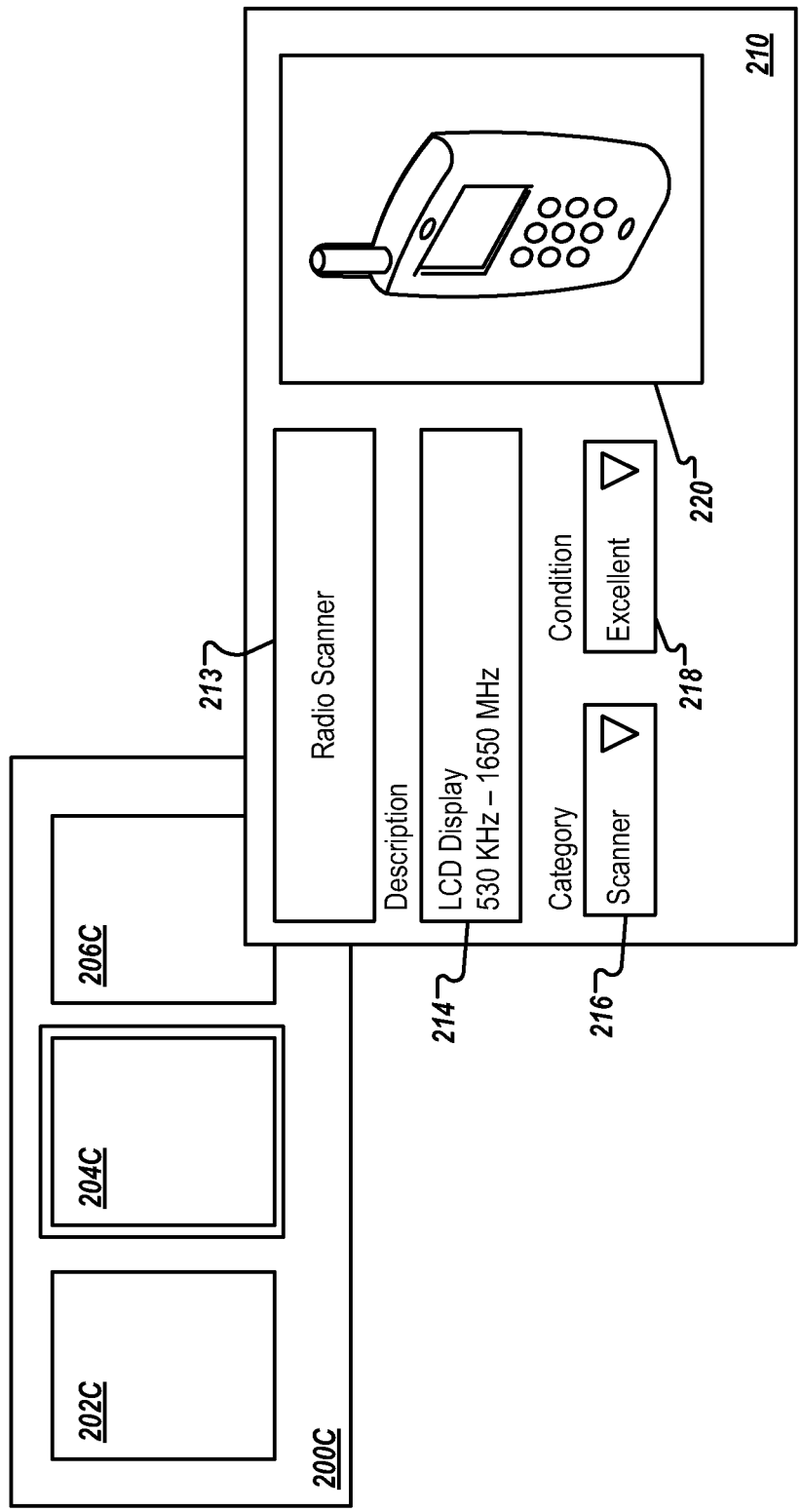

FIGS. 2A-2C illustrate exemplary mini-form view of images of database forms that are organized in a hierarchical structure. The hierarchical structure can be created by a user (e.g., by putting documents into folders, or by putting sub-folders into folders). The folders can be referred to as having a higher level in an organizational hierarchy than the documents and sub-folders. The hierarchical structure can also be determined by system logic. For example, a layout can correspond to many data records formatted using the layout. The layout can be referred to as having a higher level in the organizational hierarchy than the database forms formatted using the layout.

FIG. 2A illustrates exemplary techniques for presenting multiple display items in a hierarchical structure on mini-form view 200A. Various display items can be grouped into a hierarchical structure in a library. For convenience, the term "library" can refer to an entire collection of display items in this specification. The library can be represented as library folder 220a in folder section 210 of mini-form view 200A. Display items in the library can be represented as icons in a source list using library folder 220a as a root folder. For convenience, the term "icon" is used to describe representative entities in source list in folder section 210. An icon can be a small pictogram that represents an underlying display object. In various implementations, other forms of representations of display objects (e.g., text snippets or graphic symbols) can be used in place of icons.

By way of illustration, the source list under library folder 220a can contain icons 230a, 232a, 234a, 242a, and 244a. Each icon can correspond to a display item to be displayed in main section 212. Each icon can be a folder containing other icons. For example, icon 232a can be a folder that contains icons 242a and 244a. The icons, as shown, are placed in three levels in the hierarchical structure. For convenience, library folder 220a will be referred to as having a first level (e.g., a root level); icons 230a, 232a, and 234a will be referred to as having a second level; icons 242a and 244a will be referred to as having a third level.

A user can place a display item at any level in the hierarchy structure, including root level. For example, using a "drag and drop" feature, a user can reorganize the hierarchy structure by manipulating the icons in the source list. The user can change the levels of or relationship between the display items represented by the icons. By way of illustration, the user can move icon 234a under icon 232a. The second level display item represented by icon 234a can have a third level after the move. Similarly, the user can move icon 242a directly under library folder 220a. After the move, the third level display item represented by icon 242a can have a second level after the move.

In some implementations, display items can be organized based on the internal logical relationship between the display items. For example, icon 232a can represent a layout. Icons 242a and 244a can represent images of database forms formatted according to the layout. In some implementations, an icon can correspond to a folder created as a placeholder for organization purposes. The folder can, but is not required to, have its own display attributes. For example, icon 232a can represent a folder that is a placeholder for display items represented by icons 242a and 244a.

Content displayed in main section 212 of mini-form view 200a can correspond to icons selected in the source list. For example, when the user selects library folder 220a, display items 202a, 204a, and 206a can be displayed. Display items 202a, 204a, and 206a can correspond to icons 230a, 232a, and 234a, respectively.

Display item 204a can be represented by icon 232a, which has two sub-items. When display item 204a corresponds to a layout based on which database forms are formatted, display item 204a can be an image of the layout. When display item 204a corresponds to a folder as a placeholder, display item 204a can be an image of a first item contained in the folder. For example, display item 204a can be an image of a database form that is represented by icon 242a in the source list.

While viewing higher-level display items (e.g., second-level display items 202a, 204a, and 206a), a user can access lower-level display items (e.g., third-level display items represented by icons 242a and 244a) in various ways. In some implementations, display item 204a can be animated upon a user selection. The user can activate the animation by scrubbing display item 204a (e.g., by sliding a pointing device across at least a portion of display item 204a). For example, the user can move the pointing device according to the path indicated by the arrow across display item 204a. The pointing device can be a cursor controlled by a mouse or a finger or a stylus moving across a touch-sensitive display screen, among others. In some implementations, the sliding motion over one particular display item can activate the animation for that display item, while other display items remain unchanged.

The animation can include displaying images of display items in the lower level one after another, in a display area previously occupied by the selected higher-level display item. For example, upon receiving a user selection, the screen area that displays display item 204a can alternatively show a snapshot of database form as represented by icon 242a and a snapshot of database form as represented by icon 244a. Each of the two snapshots can be shown for a certain time period (e.g., a configurable number of seconds, also referred to as a refreshing frequency), before the other one is shown, giving an appearance of a slide show.

In some implementations, the slide show can animate the snapshots using a flipping action. In some implementations, the slide show can animate the snapshots by scrolling a snapshot out of a display area while scrolling another snapshot into the display area, mimicking a sliding motion, according to the direction of movement of the pointing device. For example, upon receiving a cursor moving from left to right according to the arrow as shown over display item 204a, the snapshot of database form as represented by icon 242a can scroll to the right until disappearing from display item 204a. The snapshot of database form as represented by icon 244a can scroll in until fully occupying the area of display item 204a. The scrolling motion can be repeated until stopped by the user (e.g., by a click on a particular display item that selects the display item). Once the scrolling motion has stopped, the selected display item (e.g., the display item represented by icon 244a) can be restored.

While the screen area that displays display item 204a is showing an animated view of display items, display items 202a and 206a need not be animated. However, each of display items 202a and 206a can be individually animated (e.g., when the display items have lower-level items and are selected). The animation of display items 202a and 206a can, but need not, use the same refreshing frequency as applied to display item 204a. In some implementations, a user can activate animations on multiple display items. For example, a user can select multiple display items (e.g., by drawing a bounding box around the display items). When the user slides a pointing device across one of the selected display items, animation can start for each selected display items.

FIG. 2B illustrates exemplary techniques for receiving user input selecting a particular display item among multiple display items in a hierarchical structure on a mini-form view 200b. Display items 202b and 206b can be images of database forms. By way of illustration, display item 204b is being animated. Various icons 220b, 230b, 232b, 242b, 244b, and 234b are shown in a source list. In some implementations, during animation, icons representing the currently displayed display item can be emphasized (e.g., by highlighting). For example, as display item 204b cycles through images of database forms, icons 242b and 244b can be alternatively highlighted.

As images cycle through display item 204b, a user can select a particular image being displayed. For example, at time an image represented by icon 242b is displayed as display item 204b, the user can perform a selection act (e.g., click, right-click, or tap, depending on type of the display device) on the image or the icon 242b (which can be highlighted) to select the display item. The selection act can pause the animation at the selected mini-form.

FIG. 2C illustrates an example mini-form view 200c after a user selects a particular mini-form among multiple display items (which can include mini-forms and other content). For convenience, folder section 210 is omitted from mini-form view 200c. Display items 202c and 206c can be images of database forms. Display item 204c has been cycling through two images of data records from an auction item database. At time a display item was displayed (e.g., a mini-form represented by icon 242b), the user pauses the display item. The user double-clicks (or taps) on the paused display item. New window 210 appears (according to a configuration that specifies that a new window, instead of a viewport, will be used). The database form underlying the mini-form (e.g., a formatted record for a radio scanner being auctioned) is shown in new window 210.

In addition to displaying formatted data, a database form can be used to accept user inputs into the database. For example, in window 210, various text sections 213 and 214, selection sections 216 and 218, and image 220 can be modified, if the user has access privilege to perform the modifications. The modifications can be communicated to the database to update corresponding data tables.

Figure 2D:
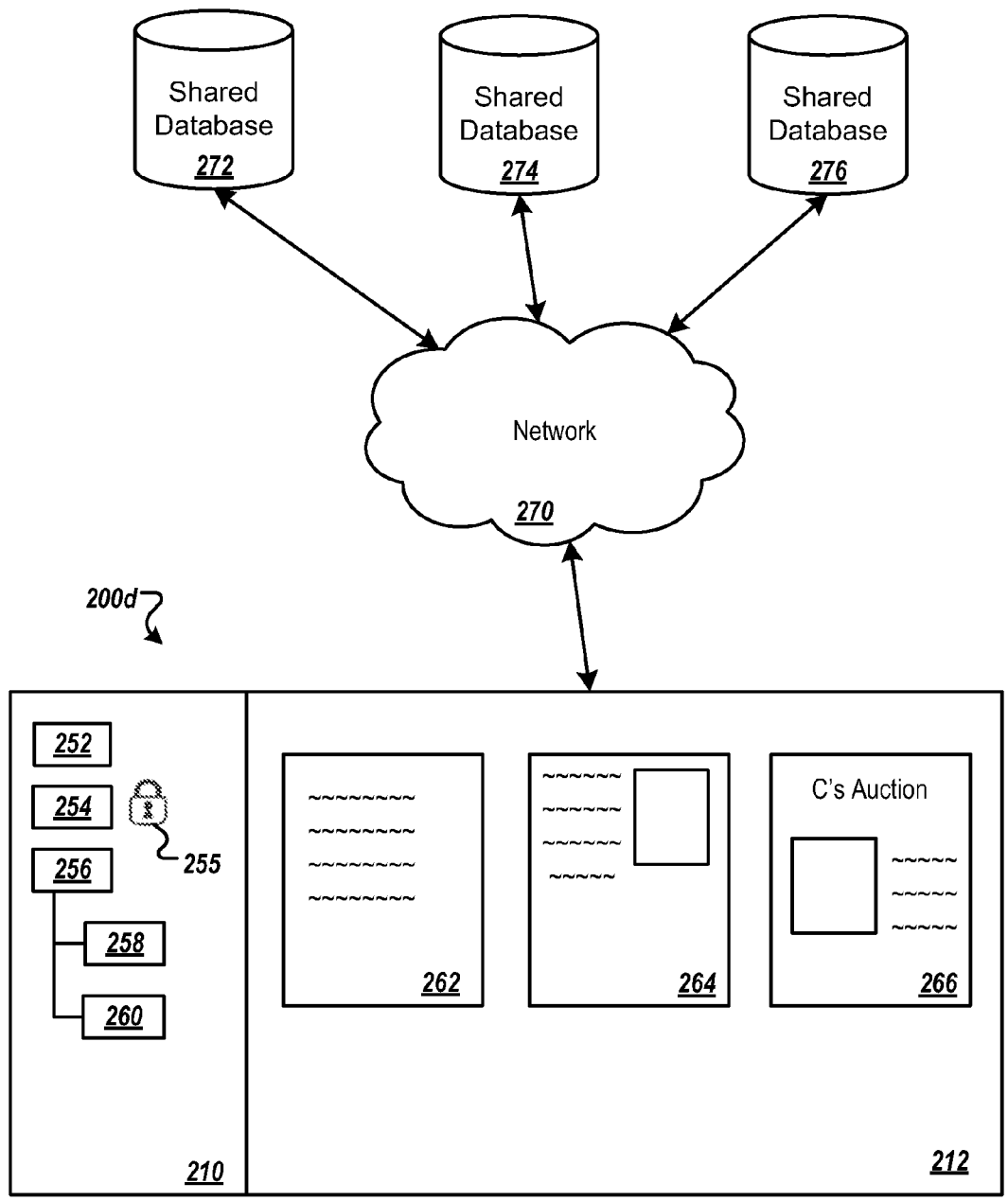
FIG. 2D illustrates an exemplary mini-form view of images of data records in shared databases.

FIG. 2D illustrates an exemplary mini-form view 200d of images of data records in shared databases. Mini-form view 200d can include multiple display objects 262, 264, and 266. Each of display objects 262, 264, and 266 can correspond to a form or other object in a shared database (e.g., shared database 272, 274, or 276). Shared databases 272, 274, and 276 can be hosted locally or remotely.

Various objects, including libraries or formatted data records, can be shared among multiple users using multiple computing devices in communications network 270. Sharing can include a user designating one or more libraries, folders, database forms, or collection of items of the user to be viewable by other users using other computing devices. By way of illustration, a user (user A) can share database 272, access shared database forms of shared database 274 created by another user (user B), and access shared library of shared database 276 created by another user (user C). By way of illustration, mini-form view 200d shows a view for user A.

User A can share display items on which user A has access and modification privileges (e.g., items that user A owns). User A can access a local database or database 272 through communications network 270, create one or more layouts, create one or more database forms using the layouts, and share the database forms by designating at least another user (user B) who can access the database forms through network 270. User B can include one or more individual users, one or more groups of users (e.g., users in "friends" or "colleagues" user groups), everyone in a particular network (e.g., an internal network), or general public, etc. By sharing the database forms, user A can allow user B to view the database forms in various mini-form views. Sharing the database forms with user B can grant user B access privileges to shared database 272. The access privileges can be limited to the database forms being shared (e.g., access to other database tables or records that are not related to the shared items can be denied). The access privileges can include read-only (e.g., user B can see a "preview" of a newly designed layout), read-and-write (e.g., user B can modify the data underlying the shared form), or share (e.g., user B can share the shared database forms with other users). Display item 262, as shown in main section 212, can be an image of user A's library, or a mini-form of one of the shared database forms.

User A can access user B's shared database forms. User B can share one or more database forms stored on a database 274. Display item 264 can be a mini-form of one of the database forms shared by user B. Depending on what access privileges are granted to user A, user A can view, edit, or share the shared database forms with other users. In some implementations, user B can require user A to enter a user name, a password, or both before database forms are displayed to user A.

User A can access user C's shared library. User C can share a library of shared database 276. The library can include database forms and other display items (e.g., images, video clippings, etc.). The library of shared database 276 is shown as display item 266 on main section 212 of mini-form view 200d. User A can view display items contained in the shared library, for example, by scrubbing across display item 262 (e.g., by moving a pointing device across display item 262). If the library contains more than one database forms, display item 266 can, by default, display a mini-form of the first database form in the library. In some implementations, when display item 262 corresponds to a library, image property fields under display item 266 can contain information on how many items there are in the library.

In some implementations, a mini-form for a library can be distinguished from non-library mini-forms by a title header. A layout can specify a title header for a form. A title header can be information that appears at a top section of a database form. When displaying a data record as a mini-form, the title section can be omitted in order to optimize the display (e.g., by maximizing the amount of information displayed for data rather than for title). When displaying a library as a mini-form (e.g., by displaying the first database form in the library), the title section can be preserved, because the title can be a common element of all database forms in the library. For example, display item 266 can include the title in the database forms (e.g., "C's Auction").

Folder section 210 of mini-form view 200d can contain icons 252, 254, and 256, which can represent display items 262, 264, and 266, respectively. Icons 258 and 260, which are shown as sub-items of icon 256, can represent display items contained in shared library of shared database 276. Folder section 210 can be populated when the user opens grid view 200d. A back-end engine can perform a search in a designated network (e.g., a corporate intranet, a subnet, or a workgroup) and locate shared libraries and database forms. The back-end engine can generate a collection of icons for the found libraries, shared database forms, and other shared display items. For a shared library or a shared database form that is protected by password, security status indicator 255 (e.g., a lock) can be displayed alongside the icon. When the user enters a valid password, security status indicator 255 can be changed (e.g., to an unlocked state), or be removed from display.

Folder section 210 and main section 212 of mini-form view 200d can be updated in response to a change in shared items over network 270. Mini-form view 200d can automatically response to remote actions. If a library is added to a database in a designated network (e.g., a company intranet), of if a library's attribute is changed from "not shared" to "shared"), a user viewing that database's shared libraries can see the new (or newly shared) library appearing automatically. For example, the new library can appear in both folder section 210 (represented by an icon) and main section 212 of mini-form view 200d (shown as a mini-form). Conversely, if a shared library is deleted, or the attribute is changed from "shared" to "not shared," folder section 210 and main section 212 will be updated accordingly.

Configuring Exemplary Mini-Form View

Figure 3A:
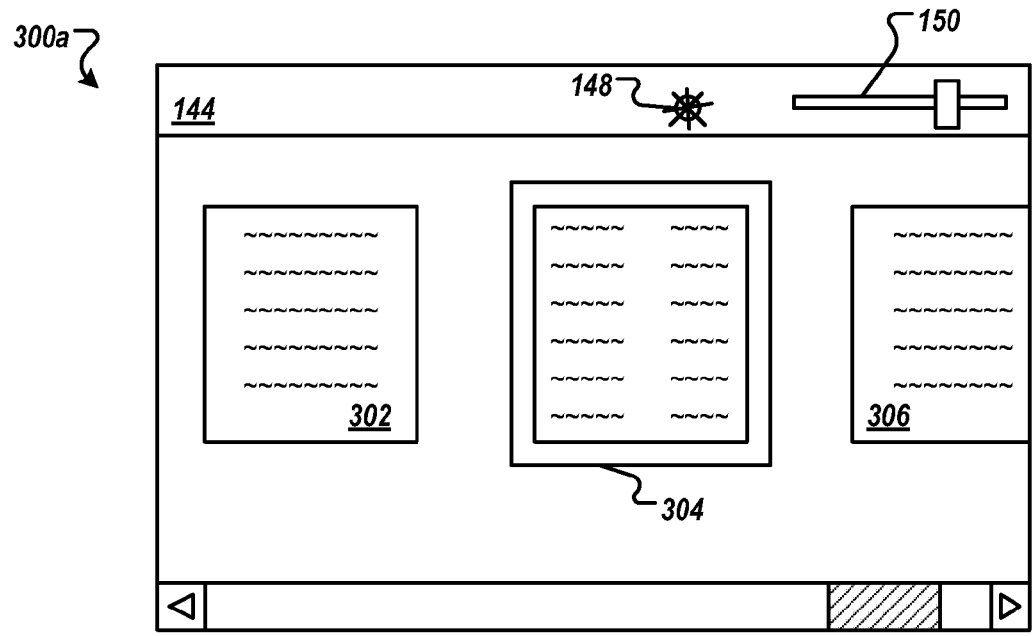
Figure 3B:
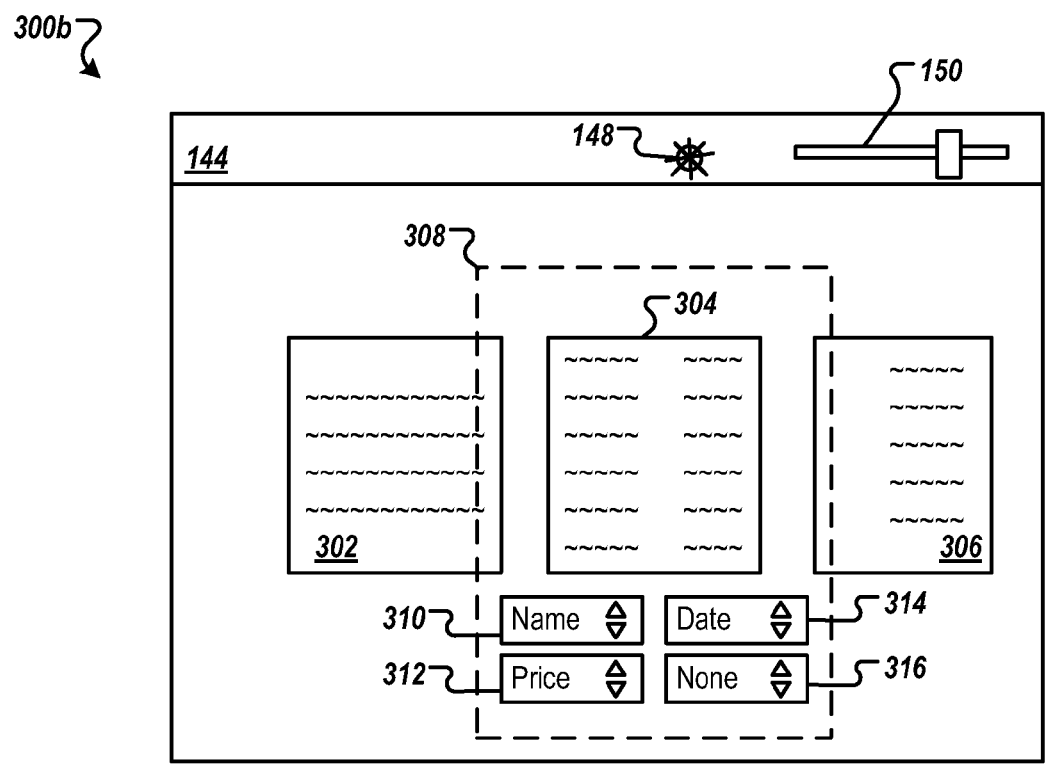

FIGS. 3A-3C illustrate exemplary user interfaces for configuring a mini-form view display of images of database forms. FIG. 3A illustrates exemplary mini-form view 300a. Mini-form view 300a can include control section 144, which can include configuration interface 148 and image size interface 150. For clarity purposes, other control interfaces are not shown. By way of illustration, display items 302, 304, and 306 are shown. Each of display items 302, 304, and 306 can be an image of a database form. Display item 304 is shown to have double frame to illustrate the fact that display item 304 is an active item being configured.

FIG. 3B illustrates exemplary mini-form view 300b in which image 304 is being configured. A user can configure display item 304 by activating configuration interface 148. For example, the user can click on configuration interface 148 using a mouse click or tap on configuration interface 148 on a touch-sensitive screen. Upon activation, configuration panel 308 can be displayed in mini-form view 300b. Configuration panel 308 can include active display item 304, and one or more label fields 310, 312, 314, and 316.

Label fields 310, 312, 314, and 316 can be utilized to describe display item 304. Label fields 310, 312, 314, and 316 can each correspond to a source data field in the data record underlying display item 304. For example, label field 310 can show a name; label field 312 can be show a price (e.g., of an item being auctioned); label field 314 can show a date; and label field 316 can be empty (e.g., "None"). By activating a scroll button on each of the label fields, a list of eligible data fields can be shown.

In some implementations, configuration panel 308 can be transparent or semi-transparent. Other display items entirely or partially covered by configuration panel 308 (e.g., display items 302 and 306) can be visible through configuration panel 308. The portions of the display items being covered can be shown in darker brightness. The user can close display panel 308 by various ways (e.g., clicking on configuration interface 148 again, or clicking on another portion of mini-form view 300b other than display panel 308).

Once the user selects a source data field for a label field, the value of the data field can be displayed in an image property label. For example, the value of "name" field 310 can be "Radio Scanner;" the value of the "price" field 312 can be "$500;" the value of the "date" field 314 can be "Sept. 09." Once display panel 308 is closed, display item 304 will have an image property label corresponding to the name, price, and date (e.g., image property label 156). Image property label 158 can be similarly configured.

FIG. 3C illustrates an exemplary mini-form view 300c in which display size of each display item is adjustable. Each display item 304 or 304 can be a thumbnail image of a database form having a dimension of m×n pixels. A thumbnail can have a size that is sufficiently large such that major characteristics of the underlying database form can be recognizable. Depending on the size of each display item, mini-form view 300c can contain more or fewer display items that are visible. In some implementations, the size of all display items can be adjusted in uniform. In some implementations, the size of each display item can be adjusted individually.

A user can adjust the size of each display item 302 or 304 using image size control interface 150. Image size control interface 150 can be a slide control interface that includes a groove and slider. A user can "grab" the slider (e.g., by click-and-hold on the slider using a mouse device, or by touching the slider using a finger or stylus on a touch-sensitive screen) and move the slider along the groove. Moving the slider to one direction (e.g., left) can cause the display item 302 and 304 to be displayed in smaller sizes; moving the slider to another direction (e.g., right) can cause the display item 302 and 304 to be displayed in larger sizes.

Image size control interface 150 can have other forms in addition to being a slide control interface. For example, image size control interface 150 can include a knob that can be turned, buttons with labels or icons, or any other mechanism.

Figure 4A:
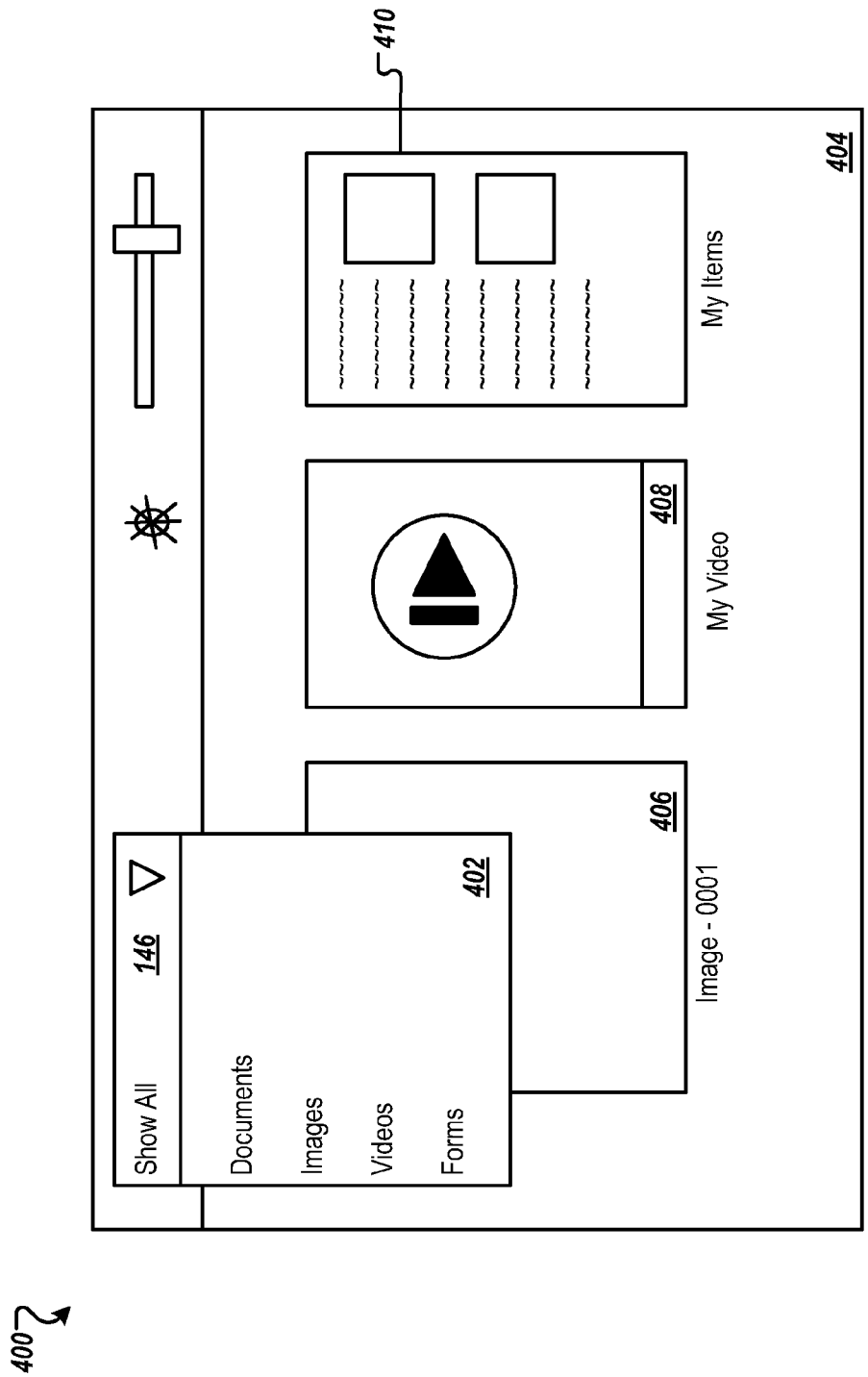
FIG. 4A illustrates an exemplary mini-form view of images of data records together with other content.

FIG. 4A illustrates an exemplary mini-form view 400 of images of database forms (e.g., mini-forms) displayed together with other content. Mini-form view 400 can include heterogeneous display items having various source, genre, and form. For example, display item 406 can include a digital picture; display item 408 can include a digital video clip; and display item 410 can include an image of a formatted data record. Display items 406, 408, and 410 can be displayed on a same main section 404 of mini-form view 400.

A user can determine which display items can be included in mini-form view 400 by way of filter selection interface 146. Filter selection interface 146 can be one of the controls in control section 144 of mini-form view 400. Filter selection interface 146 can include a dropdown list 402, listing which item can be displayed. By way of illustration, dropdown list 402 can include entries "Show All," "Document," "Image," "Video," and "Forms." A user can select one or more entries from dropdown list 402. If selected, the particular genre of display items (e.g., mini-forms, under entry "Forms") can be displayed, while unselected genre of display items can be hidden from display. Selecting "Show All" can turn off the filter and display all genres of documents.

Figure 4B:
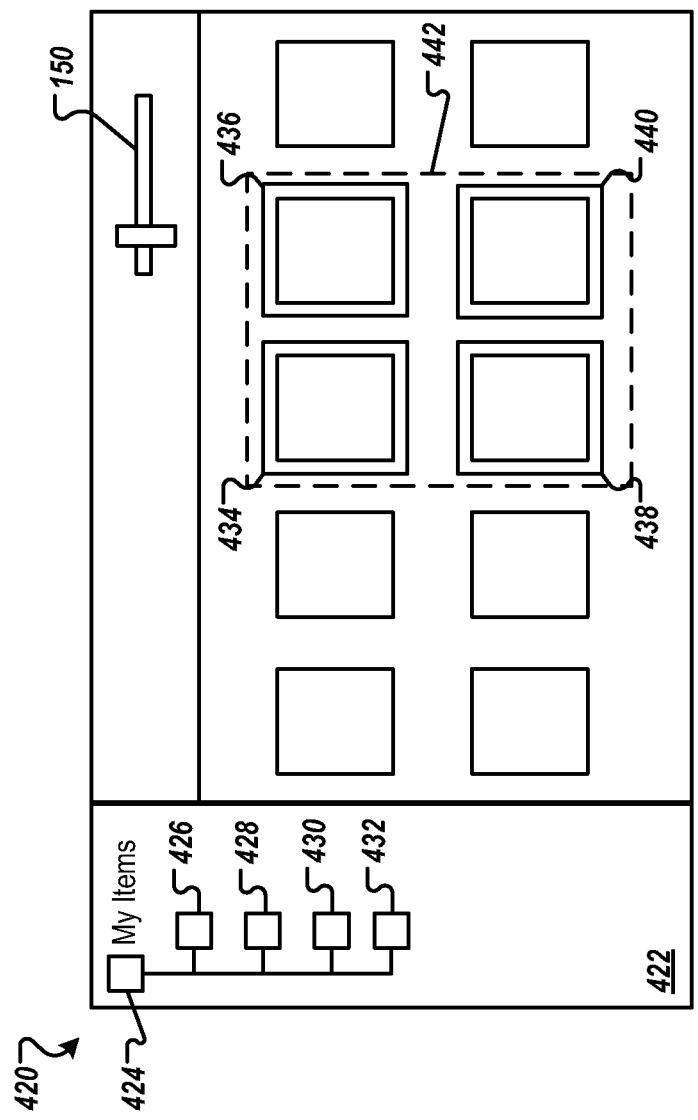
FIG. 4B illustrates an exemplary user interface for creating a library of images of data records from a mini-form view.

FIG. 4B illustrates an exemplary user interface for creating a library of images of database forms from mini-form view 420. Mini-form view 420 can include folder section 422 and main section 423. Mini-form view 420 can include multiple display items (e.g., display items 434, 436, 438, and 440, among others). Each solid-bordered box in main section 423 represents a display item.

As described above, display items can be organized in a hierarchical structure. The hierarchical structure can have a root item and various sub-items. Each sub-item can include other sub-items. For example, the hierarchical structure can include root folder 424 (e.g., a library folder) that contains various sub-items 426, 428, 430, and 432. A user can create the hierarchical structure in various ways. For example, the user can use a drag-and-drop operation to put one or more display items one level under another display item in the hierarchy.

By way of illustration, the user can select display items 434, 436, 438, and 440 by drawing bounding box 442 around display items 434, 436, 438, and 440. Display items 434, 436, 438, and 440 can be highlighted when selected (e.g., each of display items 434, 436, 438, and 440 can have a highlighted border). The user can drag bounding box 442 and drop bounding box 442 under library folder 424. Upon the drop, icons 426, 428, 430, and 432 can be created, the icons corresponding to display items 434, 436, 438, and 440, respectively. Similarly, the user can select, drag, and drop display items 434, 436, 438, and 440 into a non-root level folder.

To be placed into a same folder, display items 434, 436, 438, and 440 need not be homogeneous. Display item 434 can be an image of a database form, display item 436 can be a layout under which multiple database forms are included, and so on.

Library folder 424 can have a label "My Items," which can be editable by a user. Each of icons 426, 428, 430, and 432 can also be associated with a label. In some implementations, the label can be a label created for an image of formatted data record, e.g., an image property label as described above with reference to FIG. 1A.

Exemplary Processes for Displaying Data Records in Mini-Form View

Figure 5A:
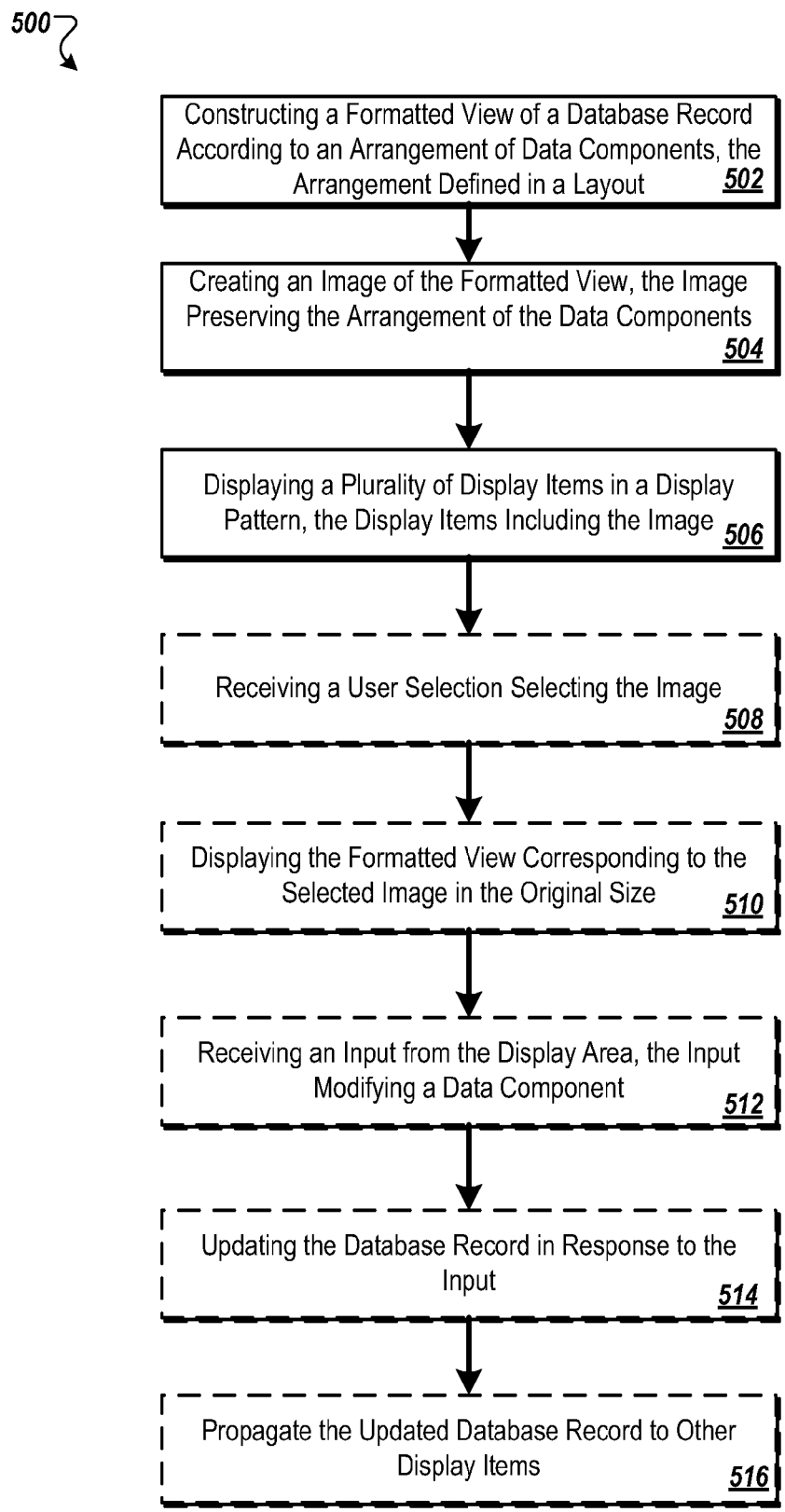
FIG. 5A is a flowchart illustrating an exemplary process of displaying data records in mini-form view.

FIG. 5A is a flowchart illustrating an exemplary process 500 of displaying data records in mini-form view. For convenience, exemplary process 500 will be described in reference to a system that implements exemplary process 500.

The system can construct (502) a formatted view (e.g., a database form) of a data record. The data in the formatted view can be retrieved from a local or remote database by one or more queries. The data record can, but is not required to, correspond to one single row of data in a database table. The data record can include one or more data fields. The format of the formatted view can be determined by a layout. The layout can define the arrangement that can represent a way information is organized and presented when a user browses, previews, or prints the data record. For example, the layout can include an arrangement of the data components on display, each data component corresponding to a data field. Various data components (e.g., data, objects, pictures, and other layout parts) having various configurations can be position on a display according to the arrangement. An application developer can design different layouts for entering data, printing reports and mailing labels, displaying web pages, and so on.

The layout of stage 502 can specify a size of the formatted view. For convenience, the size of the formatted view as specified in the layout will be referred to as an original size of the formatted view. The original size can be explicitly defined in number of pixels, measurement units (e.g., inches or centimeters), percentage of a width and height of a window, etc. In some implementations, the original size need not be specified explicitly in the layout. Size of the data components can implicitly determine the original size of the formatted view. For example, the layout can specify a font size for text fields and labels, a dimension for pictures, and an arrangement that defines how far apart one data component is displayed from another data component. The original size of the formatted view can be determined by a bounding box that includes all data components. Constructing the formatted view can include rendering the retrieved data record in computer memory using the layout.

The system can create (504) one or more images (e.g., mini-forms) corresponding to the formatted view. An image can be an actual electronic graph (e.g., a picture in Graphics Interchange Format (GIF) or any other format), or a version of the formatted view that having a size (e.g., a thumbnail size) that is distinct from the original size. In the latter case, in some implementations, a user can directly input data in the thumbnail-sized form. The image can preserve the arrangement of the data components specified in the layout. For example, the relative positions of the data components in the image can remain the same as the relative positions of the data components in the formatted view. However, the size of the data components and the distances between the data components can be scaled proportionally, such that the data components can by displayed on a smaller display area than originally designed.

The system can display (506) the image of the formatted view on a display device. The image can be displayed with other images of formatted views, as well as with other content item (e.g., pictures, video, text snippets, etc.). Each image or other content item can be referred to as a display item. The display items can be arranged in various display patterns. Some example patterns are described below with respect to FIGS. 5C-5F.

Optionally, the system can receive (508) a user selection of an image of a formatted view. The user selection can be an input that can include, for example, a single or double click on the image using a pointing device (e.g., a mouse), a tap on the image on a touch-sensitive screen using a finger or a stylus, or using a configurable key combination on a keyboard device.

Upon receiving the user selection, the system can display (510) the formatted view corresponding to the selected image in a display area. The formatted view can be displayed in a display size that is different from the image size (e.g., in a bigger size). The display area can be a separate viewport (e.g., a pane section on a display window), a new window, a full screen, etc. The display size of the formatted can be the original size specified in the layout, or another size such that text in the formatted view is intelligible and input fields are sufficiently large that the user can enter text, selections, checkmarks, etc. in order to modify data components.

Optionally, the system can receive (512) an input from the display area. The input can include a user modification of data in one or more of the data components of the formatted view. The modification can include entering or modifying text in a text field, adding, updating, or deleting a picture, making a selection, etc.

The system can update (514) the data record represented by the formatted view in response to the input. Updating the data record can include inserting, modifying, or deleting one or more data records, or inserting, modifying, or deleting a value of a field. Updating the data record can further include committing (e.g., pushing) the changes into the database.

The system can propagate (516) the updated data record to other display items. As described above, other display items can be images of database forms as well as other content. When a display item is an image of another database form, a change in the data record being modified can have a rippling effect on other data records. Changes other than updating data records can cause display items to be updated. For example, multiple mini-forms being displayed can change when a database schema changes or when the layout underlying the mini-forms changes (e.g., when display component changes size or position).

By way of illustration, a database table can include sales information for car dealerships. A layout can specify that a data field "sales amount in dollars" for dealerships shall be formatted in bold font and red color if the amount for a particular dealership is the highest among all dealerships. For other sales amounts, the data field can be displayed in normal font in black color. At the time images for various database forms are generated, the form for dealership A can show the sales amount value in bold font and red color (because A has the highest amount in sales). The image for the form for A can show a value amount in bold and red, even though the actual text in the image may not be intelligible due to the image's small size. For example, a red dash can be displayed in the image in place of the actual text. The user selects image A. A full-sized form for dealership A can be displayed in a display area (e.g., a split pane of a display window). The user can edit the sales amount value in the full-sized form. The user can type in a new and lower sales amount. After the change, dealership B can have the highest sales amount. The user saves the form. The system can update the data records. The system can propagate (516) the changes to the image for dealership B. As a result, the image for dealership B can change. A thin, black dash that represents a sales amount can be replaced by a thick, red dash.

For another example, the database forms each can contain a global data field (e.g., a company icon). If a user changes the company icon in one database form, the system can propagate (516) the change and regenerate images for other database forms, such that all images displayed on screen includes the new icon.

Figure 5B:
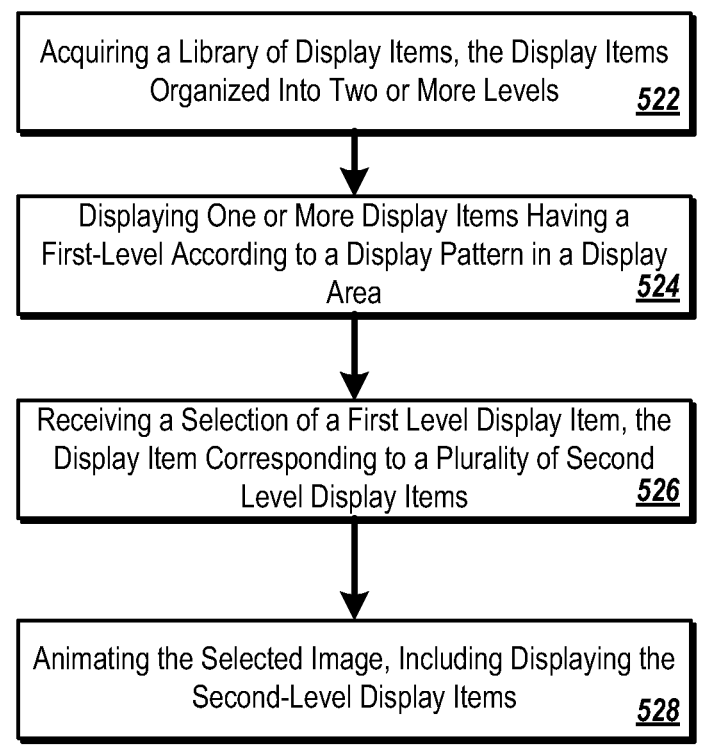
FIG. 5B is a flowchart illustrating an exemplary process of displaying images of data records that are organized in a hierarchical structure.

FIG. 5B is a flowchart illustrating an exemplary process 520 of displaying images of data records that are organized in a hierarchical structure. For convenience, exemplary process 520 will be described in reference to a system that implements exemplary process 520.

The system can acquire (522) a library of display items. The display items can be organized into two or more levels. By way of illustration, two levels are used, and referred to as a first level and a second level. The terms "first" and "second" are used to indicate a distinction between the two levels. The library can contain various display items (e.g., database forms, images of database forms, digital pictures, documents, and folders). The display items can include images of formatted views (e.g., mini-forms), each formatted view including one or more data records formatted according to a layout.

The system can display (524) one or more display items having a first-level according to a display pattern (e.g., a grid pattern) in a display area. The formatted view can have a first level based on user definition or intrinsic logic. For example, a first display item can correspond to a layout that defines display arrangements of one or more data components. The first level can be, but is not limited to, a root level or level that is directly below a root level.

The system can receive (526) a selection of one or more first-level display items. The selection can include moving across at least a portion of a first-level display item using a pointing device. The pointing device can include a cursor controlled by a mouse device, a finger or stylus gesturing on a touch-sensitive screen, or any other input device that can track motion. The selection can also made by key combination on a keyboard device. The selected display item can correspond to one or more of second-level display items. For example, the second-level display items can correspond to data records formatted according to the layout. The display data records can each include one or more data fields that correspond to the various data components.

The system can animate (528) the selected display item in response to the selection. Animating the selected display item can include displaying the second-level formatted display items that correspond to the first-level display item in the display area occupied by the first-level display item. The animation can occur at a display position that corresponds to the first-level display item, such that content of the first-level display item appears to be changing as a slide show. Other first-level display items need not be animated. However, each first-level display item can be animated individually, independent of other first-level display items. The animation can include iterating through the second-level display items, and displaying each of the second-level display item for a given amount of time, then displaying another image of second-level display item. The iteration can be repeated until interrupted (e.g., stopped by a user).

FIGS. 5C-5F illustrate exemplary display patterns of images of formatted data records. By way of illustration, a grid pattern, a stripe pattern, a stack pattern, a carousel pattern are shown. Other display patterns can be used. A user can select a display pattern among a variety of pre-configured or user-defined display patterns.

Figure 5C:
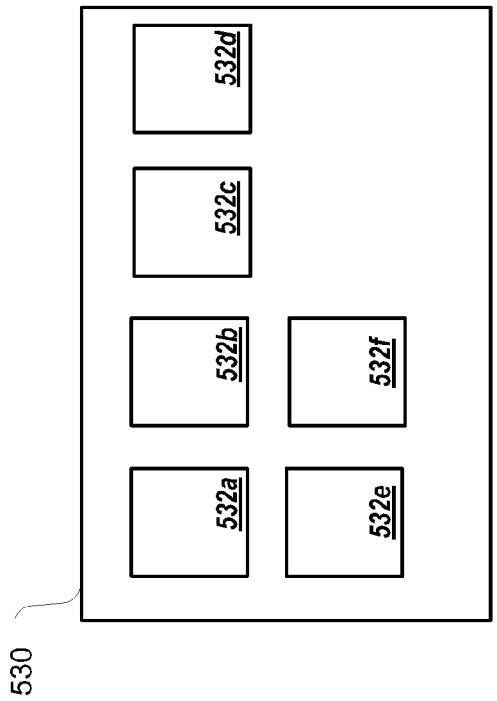
FIGS. 5C-5F illustrate exemplary display patterns of images of formatted data records.

FIG. 5C illustrates an exemplary grid display pattern 530 for displaying various display items. In grid display pattern 530, display items 532 can be shown in a grid view, e.g., evenly spaced on a grid with or without gridlines. Display items 532a, 532b, 532c, 532d, 532e, and 532f can each represent an image of a formatted data record (e.g., database forms), a picture, a part of a document, or other display content.

Figure 5D:
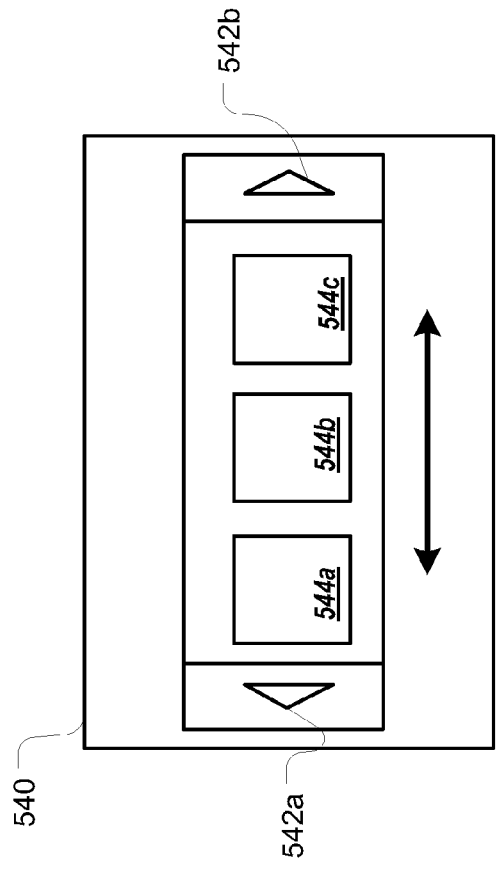

FIG. 5D illustrates an exemplary stripe display pattern 540 for displaying various display items. In stripe display pattern 540, display items 544a, 544b, and 544c can be shown linearly (horizontally or vertically). Buttons 542a and 542b can be provided for scrolling the linear stripe. Other scrolling controls can be provided as well. For example, a slide bar can be used. Scrolling control can also include a touch-sensitive display device. A user can gesture using a finger or a stylus in order to control the scrolling.

Figure 5E:
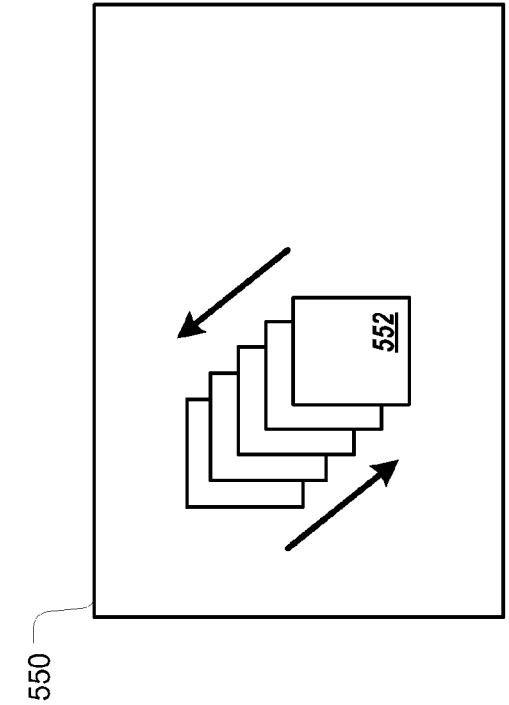

FIG. 5E illustrates an exemplary stack display pattern 550 for displaying various display items. In stack display pattern 550, the display items can be stacked upon each other (e.g., one display item fully or partially overlaps another). Display item 552, which is not covered by another display item, can be referred to as a top display item. The display items can each be moved to the top using a flip action or a parade action. For example, top display item 552 can move to the bottom of the stack in an animated fashion, and the second-top display item can move to the top in a forward parade. The display items can also move in a backward parade, upon a user command.

Figure 5F:
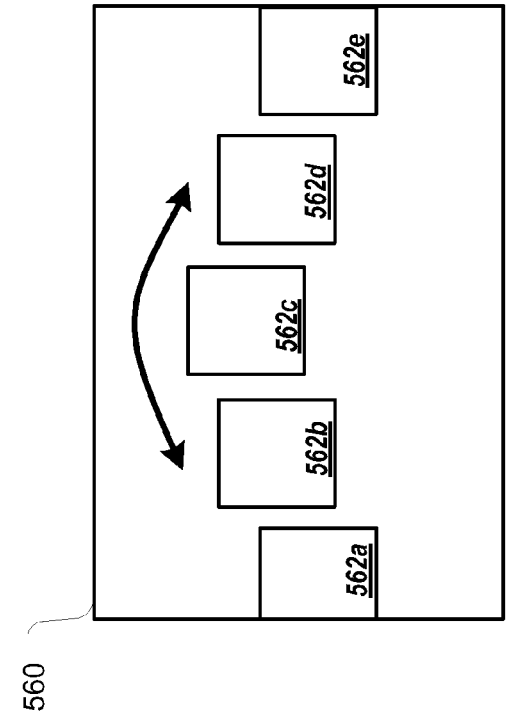

FIG. 5F illustrates an exemplary carousel display pattern 560 for displaying various display items. In carousel display pattern 560, display items 562a, 562b, 562c, 562d, 562e, and other display items can be arranged in a circle, the whole or part of the circle can be shown on a display screen. A user can navigate through the display items by turning the circle (e.g., by a click and drag using the mouse, or by a strike of a pointing device on a touch-sensitive display device, etc.). Upon receiving a user input to turn the circle, the display items 562 can be animated to simulating a turning motion around a center.

Exemplary System Architecture

Figure 6:
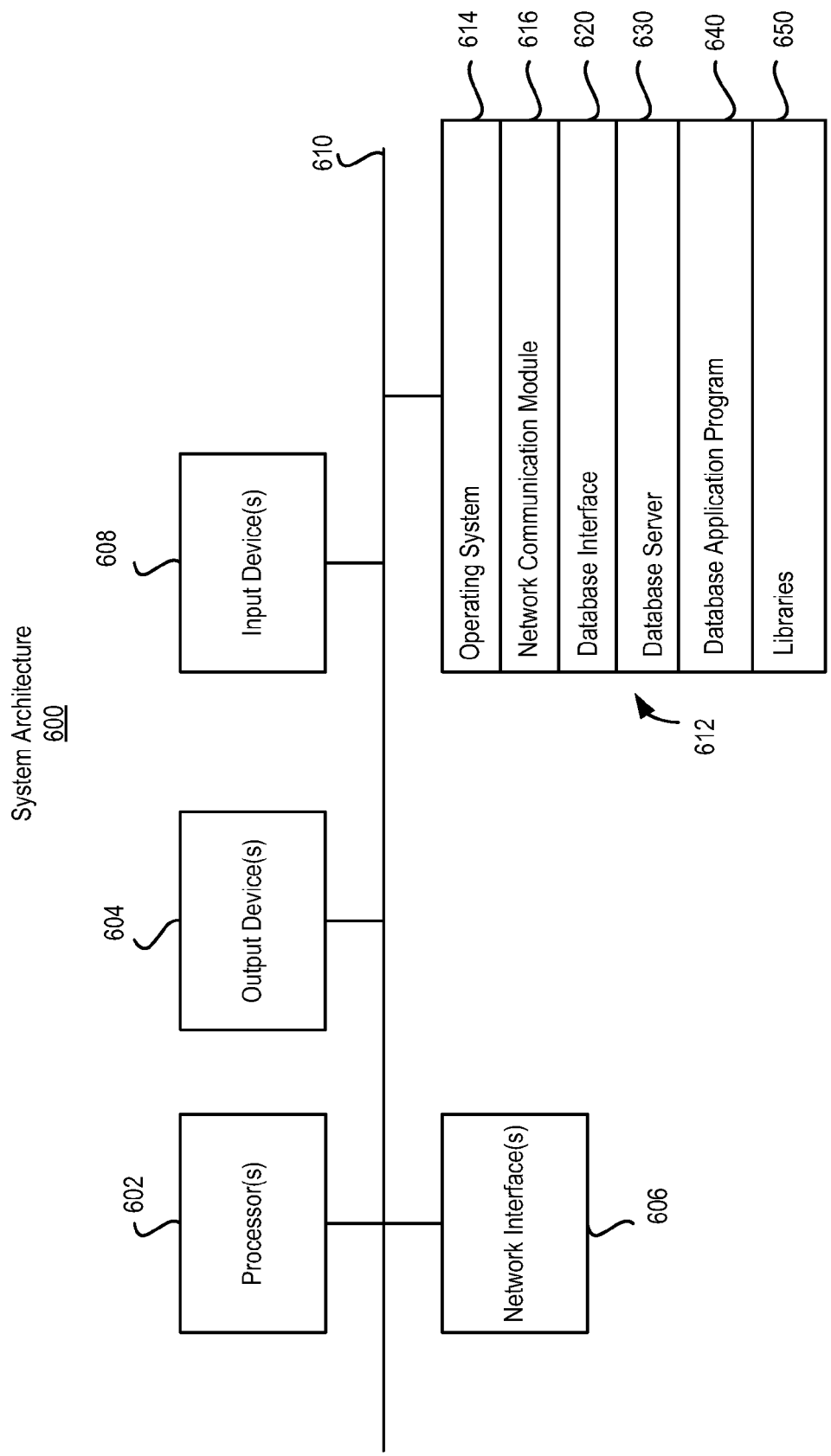
FIG. 6 is a block diagram of an exemplary system architecture for implementing the features and operations described in reference to FIGS. 1-5.

FIG. 6 is a block diagram of an exemplary system architecture 600 for implementing the features and operations described in reference to FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., Mac OS® server, Windows® NT server), network communication module 616, database interface 620, database server 630, database application program 640, and libraries 650, as described in reference to FIGS. 1-5. Operating system 614 can be multi-user, multiprocessing, multitasking, multithreading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.). Database server 630 can host one or more databases on a file system. The databases can be organized under a hierarchical folder structure, the folders mapping to directories in the file system. Database application program 640 can perform various functions for viewing data records, including formatting one or more data records in a result set according to a layout. Libraries 650 can include one or more display items or references to display items under a hierarchical structure.

Architecture 600 can be included in any device capable of hosting a database application program. Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, the terms "database forms" and "mini-forms" are used. The it is not a requirement that the forms or mini-forms must be connected to a database. Any formatted view of data is included in the scope of this specification. Accordingly, other implementations are within the scope of the following claims.

What is claimed is:

1. A computer-implemented method, comprising:
constructing a formatted view of a data record according to an arrangement of data components, the data components including a control item operable to receive a user input, the arrangement defined in a layout and specifying relative display positions of the data components, the layout specifying an original size of each of the data components;
creating a mini-form of the formatted view, the mini-form including a representation of each of the data components and preserving the relative display positions of the data components within the mini-form and having an image size that differs from an original size of the formatted view as specified by the layout, wherein creating the mini-form comprises:
replacing the control item with an image item representing the control item; and
positioning the image item at a location in the mini-form according to a display position of the control item relative to the data components within the mini-form as specified in the layout; and
providing for display, on a display device, a plurality of display items, the display items including the mini-form of the formatted view.

2. The method of claim 1, further comprising:
receiving a user selection selecting the mini-form; and
displaying the formatted view corresponding to the selected mini-form in a display area in the original size specified by the layout.

3. The method of claim 2, further comprising:
receiving an input from the display area, the input modifying one or more of the data components of the formatted view;
updating the data record in response to the input; and
propagate the updated data record to other display items.

4. The method of claim 1, wherein displaying the plurality of display items in a display pattern includes displaying the display items in a grid pattern.

5. The method of claim 1, wherein:
the data record comprises a plurality of data fields, and
each of the data components corresponds to a data field of the data record.

6. The method of claim 1, wherein the image item is operable to receive the user input.

7. The method of claim 1, wherein the mini-form is displayed in association with a user-configurable property label, the property label displaying content of a user-selected data field of the data record.

8. The method of claim 1, wherein each of the display items is a mini-form.

9. A non-transitory computer-readable medium storing a computer program product operable to cause data processing apparatus to perform operations comprising:
constructing a formatted view of a data record according to an arrangement of data components, the data components including a control item operable to receive a user input, the arrangement defined in a layout and specifying relative display positions of the data components, the layout specifying an original size of each of the data components;
creating a mini-form of the formatted view, the mini-form including a representation of each of the data components and preserving the relative display positions of the data components within the mini-form and having an image size that differs from an original size of the formatted view as specified by the layout, wherein creating the mini-form comprises:
replacing the control item with an image item representing the control item; and
positioning the image item at a location in the mini-form according to a display position of the control item relative to the data components within the mini-form as specified in the layout; and
providing for display, on a display device, a plurality of display items, the display items including the mini-form of the formatted view.

10. The non-transitory computer-readable medium of claim 9, the operations further comprising:
receiving a user selection selecting the mini-form; and
displaying the formatted view corresponding to the selected mini-form a display area in the original size specified by the layout.

11. The non-transitory computer-readable medium of claim 10, the operations further comprising:
receiving an input from the display area, the input modifying one or more of the data components of the formatted view;
updating the data record in response to the input; and
propagate the updated data record to other display items.

12. The non-transitory computer-readable medium of claim 9, wherein displaying the plurality of display items in a display pattern includes displaying the display items in a grid pattern.

13. The non-transitory computer-readable medium of claim 9, wherein:
the data record comprises a plurality of data fields, and
each of the data components corresponds to a data field of the data records.

14. The non-transitory computer-readable medium of claim 9, wherein the image item is operable to receive the user input.

15. The non-transitory computer-readable medium of claim 9, wherein the mini-form is displayed in association with a user-configurable property label, the property label displaying content of a user-selected data field of the data record.

16. The non-transitory computer-readable medium of claim 9, wherein each of the display items is a mini-form.

17. A system, comprising:
one or more computers configured to perform operations including:
constructing a formatted view of a data record according to an arrangement of data components, the data components including a control item operable to receive a user input, the arrangement defined in a layout and specifying relative display positions of the data components, the layout specifying an original size of each of the data components;
creating a mini-form of the formatted view, the mini-form including a representation of each of the data components and preserving the relative display positions of the data components within the mini-form and having an image size that differs from the original size specified by the layout, wherein creating the mini-form comprises:
  replacing the control item with an image item representing the control item; and
  positioning the image item at a location in the mini-form according to a display position of the control item relative to the data components within the mini-form as specified in the layout; and
  providing for display, on a display device, a plurality of display items, the display items including the mini-form of the formatted view.

18. The system of claim 17, the operations further comprising:
  receiving a user selection selecting the mini-form; and
  displaying the formatted view corresponding to the selected mini-form a display area in the original size specified by the layout.

19. The system of claim 18, the operations further comprising:
  receiving an input from the display area, the input modifying one or more of the data components of the formatted view;
  updating the data record in response to the input; and
  propagate the updated data record to other display items.

20. The system of claim 17, wherein displaying the plurality of display items in a display pattern includes displaying the display items in a grid pattern.

21. The system of claim 17, wherein:
  the data record comprises a plurality of data fields, and
  each of the data components corresponds to a data field of the data record.

22. The system of claim 17, wherein the image item is operable to receive the user input.

23. The system of claim 17, wherein the mini-form is displayed in association with a user-configurable property label, the property label displaying content of a user-selected data field of the data record.

24. The system of claim 17, wherein each of the display items is a mini-form.

* * * * *